(12) United States Patent
Hansen et al.

(10) Patent No.: US 6,739,832 B2
(45) Date of Patent: May 25, 2004

(54) EXHAUST TURBOCHARGER

(75) Inventors: Andreas Hansen, Baden (CH); Reto Meier, Döttingen (CH); Pierre Chappuis, Baden-Rütihof (CH)

(73) Assignee: ABB Turbo Systems AG, Baden (CH)

( * ) Notice: Subject to any disclaimer, the term of this patent is extended or adjusted under 35 U.S.C. 154(b) by 62 days.

(21) Appl. No.: 10/105,323

(22) Filed: Mar. 26, 2002

(65) Prior Publication Data
US 2002/0192076 A1 Dec. 19, 2002

(30) Foreign Application Priority Data
Mar. 30, 2001 (CH) ................................................ 0595/01

(51) Int. Cl.$^7$ ................................................ F01D 9/02
(52) U.S. Cl. .................... 415/159; 415/184; 415/191; 415/205
(58) Field of Search ................ 415/151, 159, 415/204, 205, 191, 184

(56) References Cited

U.S. PATENT DOCUMENTS 4,351,154 A * 9/1982 Richter ...................... 60/605.1
4,529,356 A * 7/1985 Ciccarone ................. 415/208.2
6,062,024 A * 5/2000 Zander et al. ................. 60/597

FOREIGN PATENT DOCUMENTS

| DE | 4201677 | 12/1992 |
|---|---|---|
| DE | 4202080 | 7/1993 |
| DE | 19838703 A1 | 3/2000 |
| EP | 0131719 | 5/1987 |
| EP | 0231824 | 8/1987 |
| EP | 0348727 | 1/1990 |
| EP | 0373639 | 6/1990 |
| GB | 1420607 | 1/1976 |

* cited by examiner

*Primary Examiner*—Edward K. Look
*Assistant Examiner*—Igor Kershteyn
(74) *Attorney, Agent, or Firm*—Burns, Doane, Swecker & Mathis, L.L.P.

(57) ABSTRACT

The exhaust turbocharger includes an exhaust gas turbine and a turbine casing, in which is formed the volute inlet flow duct which starts with an inlet connection. An exhaust gas flow is carried to the exhaust gas turbine in this duct. The turbocharger also includes a flow straightener, which is arranged in the inlet connection and guides the exhaust gas flow in the volute direction of the inlet flow duct.

9 Claims, 2 Drawing Sheets

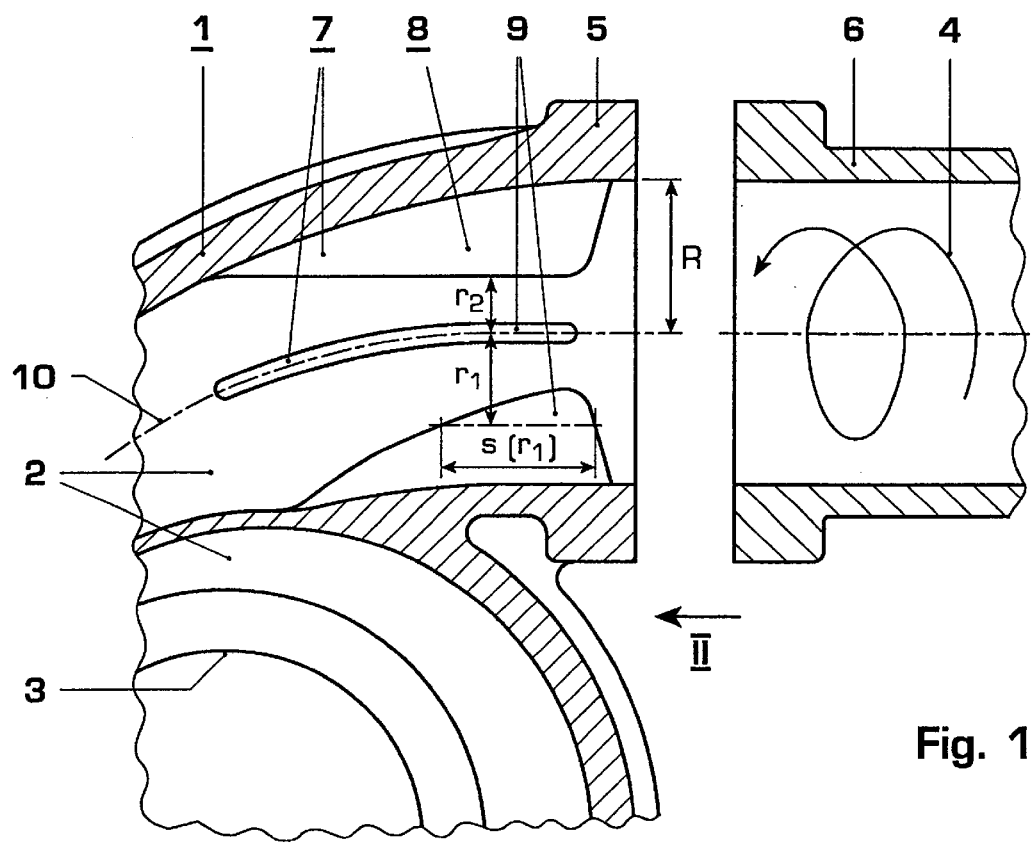
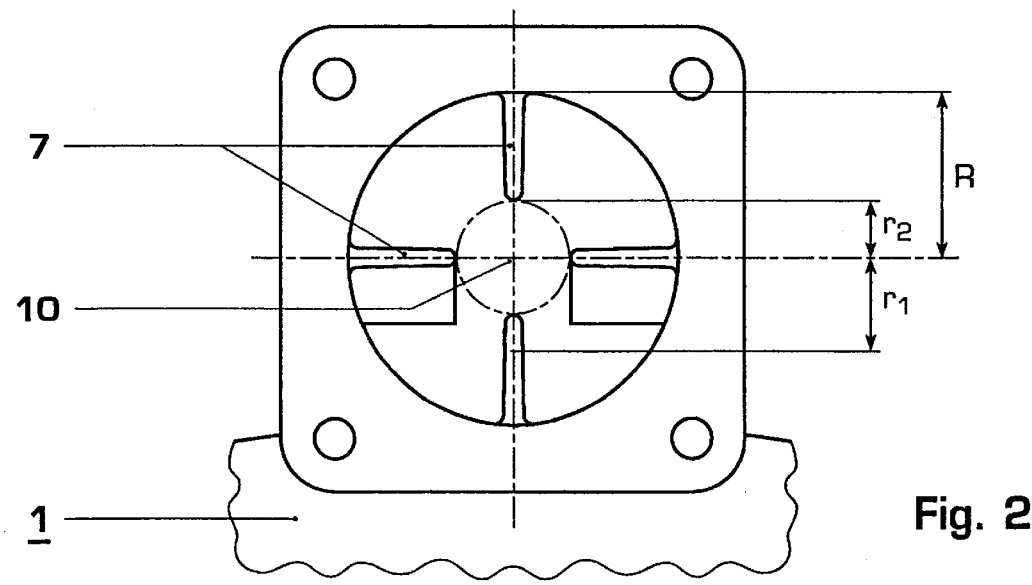
Fig. 1
Fig. 2

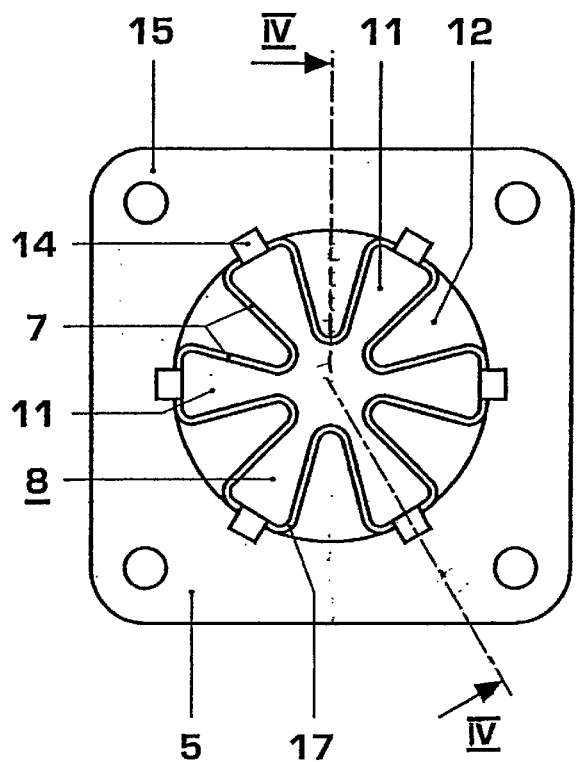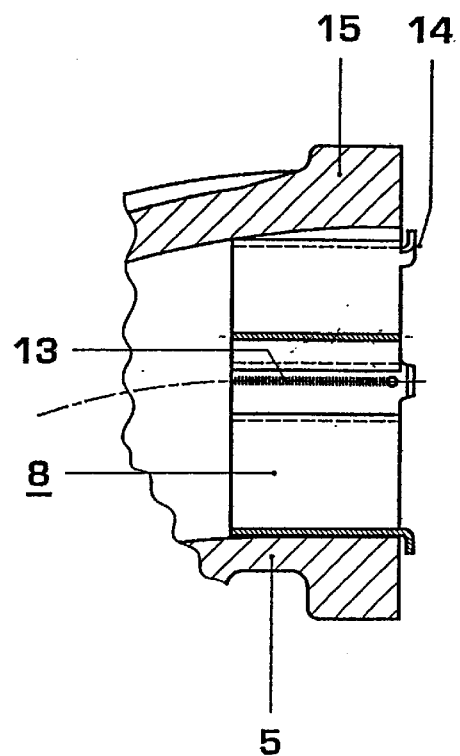
Fig. 3  Fig. 4
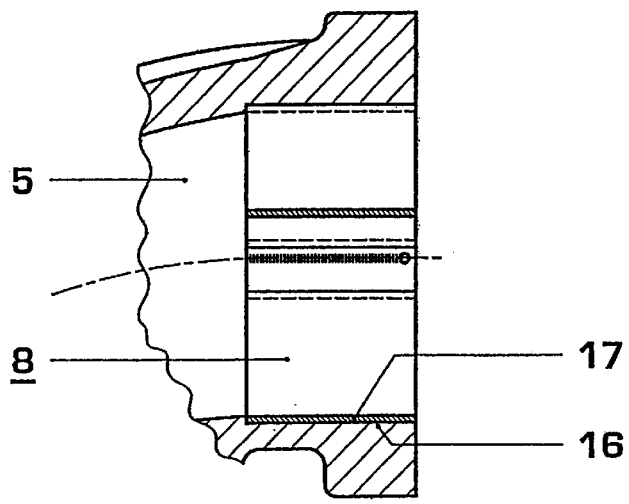
Fig. 5

EXHAUST TURBOCHARGER

TECHNICAL FIELD

The invention is based on an exhaust turbocharger as described in the preamble to claim 1. This turbocharger has an exhaust gas turbine and a turbine casing within which a volute inlet flow duct is formed. The inlet flow duct carries an exhaust gas flow to the exhaust gas turbine. In this arrangement, the flow may impinge at right angles (radial turbine) or obliquely (mixed-flow turbine) onto the leading edges of the turbine blading. The inlet flow duct is connected to an exhaust gas conduit of an internal combustion engine by means of an inlet connection. Because the exhaust gas flow is subjected to quite substantial perturbations (depending on the configuration of and loading on the internal combustion engine), the exhaust turbocharger has means of transmitting the flow in such a way that it is substantially perturbation-free when it impinges on the exhaust gas turbine.

PRIOR ART

Such an exhaust turbocharger is, for example, described in EP 0 131 719 B1, in particular the embodiment shown in FIGS. 1 and 2. In this exhaust turbocharger, the exhaust gas flow is carried through a guide apparatus with rotor blades which can be pivoted in the radial direction. Compensation is provided for pressure and velocity fluctuations in the flow by pivoting the rotor blades and, by this means, a uniform incident flow onto the exhaust gas turbine is achieved.

Such a guide apparatus is relatively complex and, in addition, requires a comparatively large amount of space.

It is also known art to smooth swirled airflows by means of flow straighteners before the air inlet of the compressor of an exhaust turbocharger in order to increase the efficiency of the turbocharger. On this point, reference is made to a flow straightener described in DE 42 01 677 C1. This flow straightener consists of a sprung sheet-metal strip, which is configured with a plurality of bends in its longitudinal extent in order to form air conduction ducts and which is inserted so that its position is fixed with pre-loading in the air induction pipe of the compressor. A free end of the sheet-metal strip is used to form the boundary of two internally located air conduction ducts relative to one another. This flow straightener would not be suitable for smoothing an exhaust gas flow because the strongly swirled, hot exhaust gas can easily excite the free end of the sheet-metal strip to undesirable vibrations.

PRESENTATION OF THE INVENTION

The invention, as defined in the claims, achieves the objective of providing an exhaust turbocharger of the type mentioned at the beginning and which, despite simple construction, is characterized by a high level of reliability even under more difficult operating conditions.

In the exhaust turbocharger according to the invention, the guide means are configured as a flow straightener and the flow straightener is arranged in the inlet connection of the turbine casing. This achieves the effect that the exhaust gas emerging from the internal combustion engine is carried via an inlet flow duct to the exhaust gas turbine in the form of a straightened flow with little swirl. This is particularly advantageous if the internal combustion engine is embodied as a gas engine or a diesel engine and exhausts to the turbocharger an exhaust gas flow which is strongly swirled and/or is subjected to large fluctuations in time. The vortices present in such a flow no longer reach the exhaust gas turbine or a guide apparatus provided upstream of the exhaust gas turbine and preferably embodied as a nozzle ring. No undesirable vibrations, which could lead to a failure of the turbocharger, can now be excited in the exhaust gas turbine and/or the guide apparatus.

If the flow straightener has guide elements having, in each case, a section which has a mainly plate-shaped configuration and which extends, in the region of the inlet connection, in the volute direction and at right angles to the latter in the radial direction, the tangential component of the exhaust gas flow in the exhaust gas conduit between the internal combustion engine and the turbocharger is decisively reduced. This prevents, to a high level of reliability, an exhaust gas flow subject to severe swirl being carried to the exhaust gas turbine.

It is recommended that the ends of the guide elements should have a free configuration because, in this way, thermal expansions caused by the hot exhaust gases cannot build up stresses in the flow straightener. The free ends of the guide elements are expediently arranged on a circle whose radius is, as a maximum, half the radius of the inlet connection of circular cross section. The tangential components of the exhaust gas flow are then greatly reduced but the pressure losses in the exhaust gas flow are, at the same time, kept small by this means.

If the casing of the exhaust turbocharger is produced by casting, it is then advantageous, from the point of view of manufacturing technology, to mold the guide elements into the inner wall of the inlet connection.

If the casing already exists, the flow straightener can then be installed particularly simply if it is embodied as an assembly unit which can be fixed in the inlet connection and has partial ducts of trapezoidal cross section extending in the direction of the tube axis of the inlet connection. First partial ducts should open at the small base side of the trapezium into a duct which is arranged centrally in the inlet connection and extends in the flow direction of the exhaust gas. In this way, the guide elements are configured with the free ends which are important with respect to the thermal stresses in the flow straightener and, at the same time, the exhaust gas flow is straightened particularly effectively on the radial arms of the trapezium. Improvement to the straightener function, while maintaining the free ends of the guide elements, is achieved by means of a second partial duct arranged between two of the first partial ducts, which second partial duct has a closed configuration on the small base side of the trapezium.

A fastening element configured as a tab is preferably formed on a wall part, of the flow straightener, which bounds the large base side of the trapezium. Such a fastening element can be carried in a simple manner by angling on a fastening flange of the inlet connection. In this way, the flow straightener can be fixed in the turbocharger in such a way that it is secured against rotation and displacement.

The flow straightener can be easily formed, from the manufacturing technology point of view, from a sheet-metal strip which is plastically deformed a plurality of times by bending in the longitudinal direction, the ends of which sheet-metal strip are connected to one another by the material becoming bonded together, by welding or the like. Because of the connection of the ends by material bonding, a mechanically stable body is formed which can satisfactorily withstand the forces transmitted by the exhaust gas flow. The metal strip is preferably formed from an alloy which is oxidation-resistant and corrosion-resistant at the exhaust temperature of the exhaust gases, on the basis of nickel-chromium or nickel-chromium-iron or the like.

If the flow straightener has an elastically deformable configuration in the radial direction and is manufactured oversize relative to the internal diameter of the inlet connection, it can be fixed under preload in the inlet connection by means of an appropriate assembly tool.

BRIEF DESCRIPTION OF THE DRAWINGS

The invention is explained in more detail below using embodiment examples, for which:

FIG. 1 shows a view, onto a section transverse to the turbine axis, through a part of a casing, having a volute configuration, of a first embodiment of the exhaust turbocharger according to the invention, in the region of an inlet connection for the exhaust gas, FIG. 2 shows an elevation, in the direction of an arrow II, onto the inlet connection of the exhaust turbocharger of FIG. 1, FIG. 3 shows an elevation onto the inlet connection of a second embodiment of the exhaust turbocharger according to the invention, with a flow straightener embodied as an assembly unit, FIG. 4 shows an elevation, in the direction of the arrow, onto the inlet connection of the exhaust turbocharger of FIG. 3, axially sectioned along IV—IV, and FIG. 5 shows a view, corresponding to FIG. 4, onto a third embodiment of the exhaust turbocharger according to the invention, which embodiment is somewhat modified relative to the embodiment of FIG. 3.

WAYS OF IMPLEMENTING THE INVENTION

In all the figures, the same designations refer to equivalent parts. Only a part of the turbine casing 1 of an exhaust turbocharger is represented in FIGS. 1 and 2. Portions of a volute flow duct 2 molded into the casing are visible on this part. This duct is used for accepting an exhaust gas flow 4 which is carried to an exhaust gas turbine 3. In this arrangement, the flow can impinge at right angles (regular turbine) or obliquely (mixed-flow turbine) onto the leading edges of the turbine blading. The inlet flow duct 2 begins at an inlet connection 5, which is connected to an internal combustion engine exhaust gas conduit 6, which carries the exhaust gas flow, and the duct 2 is guided in its volute direction 10. Guide elements 7 of a flow straightener 8 are molded on the inner wall in the inlet connection, which guide elements 7 are respectively distributed in the peripheral direction. Each guide element 7 has a section 9 which has a mainly plate-shaped configuration and which extends, in the region of the inlet connection, in the volute direction 10 and at right angles to it in the radial direction.

The tangential component of the exhaust gas flow 4 accepted from the exhaust gas conduit 6 of the internal combustion engine is perturbed by the configuration and arrangement of the guide elements 7. This prevents a strongly swirled exhaust gas flow 4 being carried to the exhaust gas turbine 3. This avoids undesirable vibration of the exhaust gas turbine blading and a possible failure of the exhaust gas turbocharger caused by it. For effective straightening, the chord/pitch ratio is selected to be greater than unity. In this statement, the chord length is defined by the length $s(r_1)$ of the guide element 7 at the radius $r_1$ in the volute direction 10. In the case of n guide elements, the pitch is $2\pi \cdot r_1/n$ and the chord/pitch ratio is then defined by $s(r_1) \cdot n / 2\pi \cdot r_1$.

It may be seen that the ends of the guide elements have a free configuration. Thermal expansion caused by the hot exhaust gases can not, therefore, build up damaging material stresses in the flow straightener. The free ends of the guide elements are arranged on a circle, whose radius $r_2$ is, as a maximum, half the radius R of an inlet connection 5 which has a circular cross section. The tangential component of the exhaust gas flow is suppressed sufficiently strongly by this means. The exhaust gas flow pressure losses in the flow straightener 8 are, at the same time, also kept small.

Because the guide elements 7 are molded into the turbine casing, the flow straightener 8 is mechanically stable and insensitive to vibration excitation. In addition, it then consists of the same material as the turbine casing and can satisfactorily withstand the oxidizing and corrosive effect of the exhaust gases.

The embodiment of FIGS. 1 and 2 is advantageous if the turbine casing 1 is manufactured by casting or the like and the flow straightener 8 can then be molded directly into the casing. If, however, the flow straightener is to be installed in an already existing exhaust turbocharger, or if a casting mold or a tool for the turbine casing already exists, it is then useful to configure the exhaust turbocharger as shown in the embodiments of FIGS. 3 and 4 or 5. In these embodiments, the flow straightener 8 is embodied as an assembly unit which can be fixed in the inlet connection 5 and has partial ducts 11, 12 of trapezoidal cross section extending in the direction of the tube axis 10 of the inlet connection. First partial ducts 11 enter, at the small base side of the trapezium, a central duct arranged in the inlet connection and extending in the volute direction 10. This achieves the free ends for the guide element 7, which free ends are advantageous with respect to the thermal stresses on the flow straightener 8, and the exhaust gas flow is also particularly effectively straightened on the radially carried arms of the trapezium. One of the second partial ducts 12 is arranged between two first partial ducts 11. In the case of this second partial duct and further second ducts 12, the small base side of the trapezium has a closed configuration in each case. Because the partial ducts 12 are closed toward the inside, the swirl component is destroyed particularly effectively within them. The straightening of the exhaust gas flow is additionally improved by this means.

The flow straightener used in the embodiments of FIGS. 3 and 4 or of FIG. 5 is formed from a sheet-metal strip which is bent a plurality of times in a longitudinal direction and whose ends are connected to one another by the material becoming bonded together, by welding or the like. By means of the connection of the ends by material bonding, which can be recognized from a weld seam visible in FIG. 4, and a plastic deformation of the sheet-metal strip so as to form the trapezoidal profile of the partial ducts 11 and 12, a mechanically stable body is achieved which can satisfactorily withstand the forces transmitted by the hot exhaust gas flow. The sheet-metal strip is formed from an alloy, which is oxidation-resistant and corrosion-resistant at the temperature of the exhaust gases, based on nickel-chromium or nickel-chromium-iron or the like.

It may be seen from FIGS. 3 and 4 that a fastening element configured as a tab 14 is formed on a wall part 17 of the flow straightener, which bound the large base side of the trapezium. This tab is carried, angled outward, on a radial surface of a fastening flange 15 of the inlet connection 5. A plurality of such tabs 14 secure the flow straightener 8 by being pressed by the inlet flow duct in the connection 5.

Alternatively or additionally, as may be seen from FIG. 5, the flow straightener 8 can also be secured in grooves 16.

These grooves are molded in the inner wall of the inlet connection and extend in the axial direction (volute direction 10). They are offset relative to one another in the peripheral direction. The flow straightener is, in an effective manner, fixed axially in the inlet connection and secured against rotation by the introduction of the wall sides 17 of the flow straightener 8 into these grooves.

Particularly good fixing of the flow straightener in the inlet connection 5 is achieved if the flow straightener has an elastically deformable configuration in the radial direction and is manufactured oversize relative to the grooves 16. After the insertion of the preloaded flow straightener with an assembly tool and subsequent relief, clamping forces additionally secure the flow straightener.

| List of designations | |
|---|---|
| 1 | Turbine casing |
| 2 | Inlet flow duct |
| 3 | Exhaust gas turbine |
| 4 | Exhaust gas flow |
| 5 | Inlet connection |
| 6 | Exhaust gas conduit |
| 7 | Guide elements |
| 8 | Flow straightener |
| 9 | Plate-shaped sections |
| 10 | Volute direction |
| 11, 12 | Partial ducts |
| 13 | Weld seam |
| 14 | Tab |
| 15 | Fastening flange |
| 16 | Groove |
| 17 | Wall part |

What is claimed is:

1. An exhaust turbocharger, having an exhaust gas turbine, a turbine casing within which is formed a volute inlet flow duct, which starts with an inlet connection for accepting an exhaust gas flow which can be carried to the exhaust gas turbine and having means for guiding the exhaust gas flow in the volute direction of the inlet flow duct, wherein the guide means have a flow straightener arranged in the inlet connection, said flow straightener having guide elements, each of said guide elements having a mainly plate-shaped section and a free end, said plate-shaped section extending in the region of the inlet connection in and radially perpendicular to the volute direction, and said free end being arranged adjacent the cross-sectional center of the flow duct;

wherein said free ends are arranged on a circle whose radius ($r_2$) is, as a maximum, half the radius (R) of the inlet connection of circular cross section.

2. The exhaust turbocharger as claimed in claim 1, wherein the guide elements are molded into the inner wall of the inlet connection.

3. An exhaust turbocharger, having an exhaust gas turbine, a turbine casing within which is formed a volute inlet flow duct, which starts with an inlet connection for accepting an exhaust gas flow which can be carried to the exhaust gas turbine and having means for guiding the exhaust gas flow in the volute direction of the inlet flow duct, wherein the guide means have a flow straightener arranged in the inlet connection, said flow straightener being embodied as an assembly unit which can be fixed in the inlet connection and having partial ducts, each of which is of trapezoidal cross section and extends in the volute direction of the inlet connection.

4. The exhaust turbocharger as claimed in claim 3, wherein first partial ducts open at the small base side of the trapezium into a duct which is arranged centrally in the inlet connection and extends in the volute direction of the inlet connection.

5. The exhaust turbocharger as claimed in claim 4, wherein a second partial duct, which is arranged between two first partial ducts, has a closed configuration on the small base side of the trapezium.

6. The exhaust turbocharger as claimed in claim 3, wherein a fastening element configured as a tab and carried, angled, on a fastening flange of the inlet connection is formed on a wall part of the flow straightener, which bounds the large base side of the trapezium.

7. The exhaust turbocharger as claimed in claim 3, wherein the flow straightener has a sheet-metal strip which is bent a plurality of times in the longitudinal direction and whose ends are connected to one another by the material becoming bonded together.

8. The exhaust turbocharger as claimed in claim 7, wherein the flow straightener has an elastically deformable configuration in the radial direction and is manufactured oversize relative to grooves, which are molded in the inner wall of the inlet connection.

9. The exhaust turbocharger as claimed in claim 7, wherein the sheet-metal strip is formed from an alloy which is oxidation-resistant and corrosion-resistant at the exhaust temperature of the exhaust gases.

\* \* \* \* \*